United States Patent
Kandala et al.

(10) Patent No.: US 12,294,984 B2
(45) Date of Patent: May 6, 2025

(54) SYSTEMS, METHODS, AND APPARATUS FOR MULTI-LINK SPATIAL MULTIPLEXING

(71) Applicant: Samsung Electronics Co., Ltd., Suwon-si (KR)

(72) Inventors: Srinivas Kandala, Morgan Hill, CA (US); Wook Bong Lee, San Jose, CA (US); Ashok Ranganath, San Jose, CA (US); Sharan Naribole, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 362 days.

(21) Appl. No.: 17/373,762

(22) Filed: Jul. 12, 2021

(65) Prior Publication Data

US 2022/0046621 A1    Feb. 10, 2022

Related U.S. Application Data (60) Provisional application No. 63/066,805, filed on Aug. 17, 2020, provisional application No. 63/063,215, filed on Aug. 7, 2020.

(51) Int. Cl.
*H04W 72/04*   (2023.01)
*H04W 72/044*   (2023.01)
*H04W 76/15*   (2018.01)

(52) U.S. Cl.
CPC ......... *H04W 72/046* (2013.01); *H04W 76/15* (2018.02)

(58) Field of Classification Search
CPC ............... H04W 72/046; H04W 76/15; H04W 74/0816; H04W 28/0236; H04W 28/082;

(Continued)

(56) References Cited

U.S. PATENT DOCUMENTS

| | | | |
|---|---|---|---|
| 2015/0023278 A1* | 1/2015 | Boccardi | H04L 5/0048 370/329 |
| 2019/0158385 A1* | 5/2019 | Patil | H04W 76/15 |

(Continued)

FOREIGN PATENT DOCUMENTS

| | | |
|---|---|---|
| WO | 2020001517 A1 | 1/2020 |
| WO | 2020060169 A1 | 3/2020 |
| WO | 2020085824 A1 | 4/2020 |

OTHER PUBLICATIONS

Multi-link Spatial Multiplexing by Yongho Seok by Mediatek, Jul. 2020 (Year: 2020).*

(Continued)

*Primary Examiner* — Pamit Kaur
(74) *Attorney, Agent, or Firm* — Renaissance IP Law Group LLP (57) ABSTRACT

A wireless device may include a transceiver configured to communicate through a first link and a second link. The wireless device may be configured to indicate, through the transceiver, a number of spatial streams associated with the first link. The wireless device may include one or more radio frequency (RF) chains and may be configured to indicate a sharing capability of the one or more RF chains between the first and second links. The wireless device may be configured to perform a collision avoidance operation based on switching an RF chain from the first link to the second link. The wireless device may be configured use an RF chain on the first link based on the availability of the first link. A method of performing a sounding operation may include initiating a sounding sequence on a link based on a sounding feedback capability of a wireless device.

18 Claims, 7 Drawing Sheets

(58) Field of Classification Search
CPC ..... H04W 74/002; H04W 8/24; H04W 84/12; H04B 7/0697; H04B 7/0413; H04B 17/309
See application file for complete search history.

(56) References Cited

U.S. PATENT DOCUMENTS

| | | | |
|---|---|---|---|
| 2019/0173634 A1* | 6/2019 | Teyeb | H04W 36/0088 |
| 2020/0221545 A1* | 7/2020 | Stacey | H04W 48/16 |
| 2020/0396568 A1 | 12/2020 | Huang et al. | |
| 2021/0007168 A1 | 1/2021 | Asterjadhi et al. | |
| 2021/0045175 A1 | 2/2021 | Huang et al. | |
| 2021/0058868 A1 | 2/2021 | Cariou et al. | |
| 2021/0084711 A1 | 3/2021 | Park et al. | |
| 2021/0100053 A1 | 4/2021 | Park et al. | |
| 2021/0144698 A1 | 5/2021 | Kwon et al. | |
| 2022/0061051 A1* | 2/2022 | Song | H04W 72/0453 |
| 2023/0164634 A1* | 5/2023 | Jang | H04W 8/24 370/329 |

OTHER PUBLICATIONS

Das, Dibakar et al., "Blindness Issue for Non-STR Operations Followup," doc.: IEEE 802.11-20/1009r10, Jul. 3, 2020, 16 pages.
European Extended Search Report for Application No. 21187871.5, mailed May 27, 2022.
Naribole, Sharan et al., "MLD Spatial Multiplexing Considerations", IEEE 802.11-20/0977rl, Jul. 15, 2020, 15 pages.
Adhikari, Shubhodeep et al., "TDM Multilink Operation", Broadcom, doc.: IEEE 802.11-20/0659r1, Mar. 16, 2020, 17 pages.
European Partial Search Report for Application No. 21187871.5, mailed Jan. 10, 2022.
Kwon, Young Hoon et al., "NSTR MLD Operation", IEEE 802.11-20/0900r0, Jun. 10, 2020, 16 pages.
Naribole, Sharan et al., "MLO Constraint Indication and Operating Mode", IEEE 802.11-20/0226r3, Mar. 15, 2020, 27 pages.
Park, Minyoung et al., "Enhanced Multi-Link Single Radio Operation", Intel Corporation, doc.: 802.11-20/0562r6, Jun. 4, 2020, 28 pages.
Seok, Yongho et al., "Multi-Link Spatial Multiplexing", IEEE Draft; 11-20-0883-01-00BE-MULTI-LINK-SPATIALMULTIPLEXING, IEEE-SA Mentor, Piscataway, NJ USA, vol. 802.11 EHT; 802.11be, No. 1, Jul. 2020, XP068169994, Retrieved from the Internet: URL:https://mentor.ieee.org/802.11/dcn/20/11-20-0883-01-00bemulti-link-spatial-multiplexing.pptx [retrieved on Jul. 14, 2020], 16 pages.
European Office Action for Application No. 21187871.5, mailed May 16, 2024.

* cited by examiner

SYSTEMS, METHODS, AND APPARATUS FOR MULTI-LINK SPATIAL MULTIPLEXING

CROSS-REFERENCE TO RELATED APPLICATION

This application claims priority to, and the benefit of, U.S. Provisional Patent Application Ser. No. 63/063,215 titled "Multicast Listener Discovery Multi-Link Spatial Multiplexing" filed Aug. 7, 2020 which is incorporated by reference, and U.S. Provisional Patent Application Ser. No. 63/066,805 titled "Multicast Listener Discovery Multi-Link Spatial Multiplexing" filed Aug. 17, 2020 which is incorporated by reference.

TECHNICAL AREA

This disclosure relates generally to communication systems, and specifically to systems, methods, and apparatus for multi-link spatial multiplexing.

BACKGROUND

Some communication systems may improve performance by implementing multi-link operations in which two or more devices may be configured to transfer data through multiple links. In some embodiments, one or more of the links may use multiple spatial streams to further improve performance. A radio frequency chain (e.g., a receive chain or a transmit chain) may be required for each spatial stream. However, in some embodiments, one or more chains may be shared between links.

The above information disclosed in this Background section is only for enhancement of understanding of the background of the invention and therefore it may contain information that does not constitute prior art.

SUMMARY

A wireless device may include a transceiver configured to communicate through a first link and a second link, wherein the wireless device may be configured to indicate, through the transceiver, a number of spatial streams associated with the first link. The number of spatial streams associated with the first link may include a maximum number of spatial links for the first link. The wireless device may be further configured to indicate, through the transceiver, a maximum number of spatial streams for the second link.

A wireless device may include a transceiver configured to communicate through a first link and a second link, wherein the transceiver may include one or more radio frequency (RF) chains, wherein the wireless device may be configured to indicate, through the transceiver, a sharing capability of the one or more RF chains. The sharing status may indicate that the transceiver may be capable of sharing at least one of the one or more RF chains between the first link and the second link. The sharing status may indicate a number of RF chains the transceiver may be capable of sharing between the first link and the second link.

A wireless device may include a transceiver configured to communicate through a first link and a second link, wherein the transceiver may be configured to share a radio frequency (RF) chain between the first link and the second link, wherein the wireless device may be configured to perform a collision avoidance operation based on switching the RF chain from the first link to the second link. The collision avoidance operation may include monitoring the second link. The collision avoidance operation may include monitoring the second link based on a wait time.

A wireless device may include a transceiver configured to communicate through a first link and a second link, wherein the transceiver may be configured to share a radio frequency (RF) chain between the first link and the second link, wherein the wireless device may be configured to determine an availability of the first link, and use the RF chain on the first link based on the availability of the first link. The wireless device may be configured to determine the availability of the first link by monitoring the first link. The wireless device may be configured to determine the availability of the first link by monitoring the first link based on a wait time. The wireless device may be configured to override the monitoring based on a first characteristic of the first link and a second characteristic of the second link. The wireless device may be further configured to use the RF chain on the first link based on information associated with a request received at the wireless device. The information may include information for switching the RF chain between the first link and the second link. The wireless device may be further configured with a default operation. The default operation may include switching the RF chain to the first link based on receiving a request at the wireless device.

A method of performing a sounding operation may include initiating a first sounding sequence on a first link between a first wireless device and a second wireless device, and initiating a second sounding sequence on a second link between the first wireless device and the second wireless device based on a sounding feedback capability of the second wireless device. Initiating the second sounding sequence may include scheduling the second sounding sequence to avoid overlapping the first sounding sequence and the second sounding sequence. Initiating the second sounding sequence may include initiating the second sounding sequence based on a request from the second wireless device.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

A wireless multi lank operation (MLO) may involve two multi-link devices (MLDs) configured to transfer data through multiple links. For example, one MLD may have multiple access points (APs), and a second MLD may have multiple stations (STAB). Each AP at the first MLD may communicate with a corresponding STA at the second MLD, thereby forming a corresponding link. To increase bandwidth, one or more of the links may use multiple spatial streams. In some embodiments, an MLD may have a dedicated radio frequency (RF) chain (e.g., a receive chain or a transmit chain) for each spatial stream of each link. However, to reduce costs, complexity, power consumption, and/or the like, an MLD may share one or more chains between links.

In some embodiments, to facilitate spatial multiplexing, a non-AP MLD may indicate one or more capabilities to an AP MLD. For example, a non-AP MLD may indicate a maximum number of spatial streams it may accommodate on each link. As another example, a non-AP MLD may indicate whether it shares any receive chains among links. Depending on the implementation details, this may enable one or more additional modes of MLO operation.

In some embodiments, an MLD may implement a collision avoidance technique to mitigate synchronization issues that may be caused by sharing receive chains. For example, if a first link is without a receive chain while the chain is being used by a second link, a network allocation vector (NAV) for the first link may not be properly synchronized when the receive chain switches back to the first link. In some embodiments, an MLD may avoid collisions caused by lost synchronization of a link, for example, by implementing a waiting period when a shared receive chain is switched to the link.

In some embodiments, an MLD may implement a policy of immediately switching to the maximum number of spatial streams for a link in response to a transmission request. Such a policy may be implemented, for example, as a default policy. In some embodiments, an MLD may determine the availability of one or more other links before committing resources to a link. For example, an MLD may implement a wait time after receiving a transmission request for a first link to determine if a second link with better performance becomes available. In some embodiments, a wait time or other technique for determining availability may be applied on a per-link basis. For example, an MLD may immediately switch receive chains to links with relatively high performance, but the MLD may wait to see if a higher performance link may become available before switching a receive chain to a link with relatively low performance.

In some embodiments, to facilitate sharing of one or more beamforming sounding resources, an MLD may implement one or more sounding procedures or policies. For example, an MLD may not initiate two sounding sequences that may overlap on two links that share beam forming feedback resources for a sounding sequence. As another example, an MLD may request re-initiation of a sounding sequence that may overlap with another sounding sequence for the MLD.

This disclosure encompasses numerous inventive principles relating to spatial multiplexing and MLDs. These principles may have independent utility and may be embodied individually, and not every embodiment may utilize every principle. Moreover, the principles may also be embodied in various combinations, some of which may amplify the benefits of the individual principles in a synergistic manner.

Some example embodiments of systems, apparatus, devices, processes, methods, and/or the like illustrating some possible implementation details according to this disclosure are described herein. These examples are provided for purposes of illustrating the principles of this disclosure, but the principles are not limited to or defined by these embodiments, implementation details, and/or the like. For example, some embodiments may be described in the context of Wi-Fi (e.g., IEEE 802.11) wireless communication systems, but the principles may also be applied to any other types of wired and/or wireless systems.

Spatial Multiplexing and Multi-Link Devices

Figure 1:
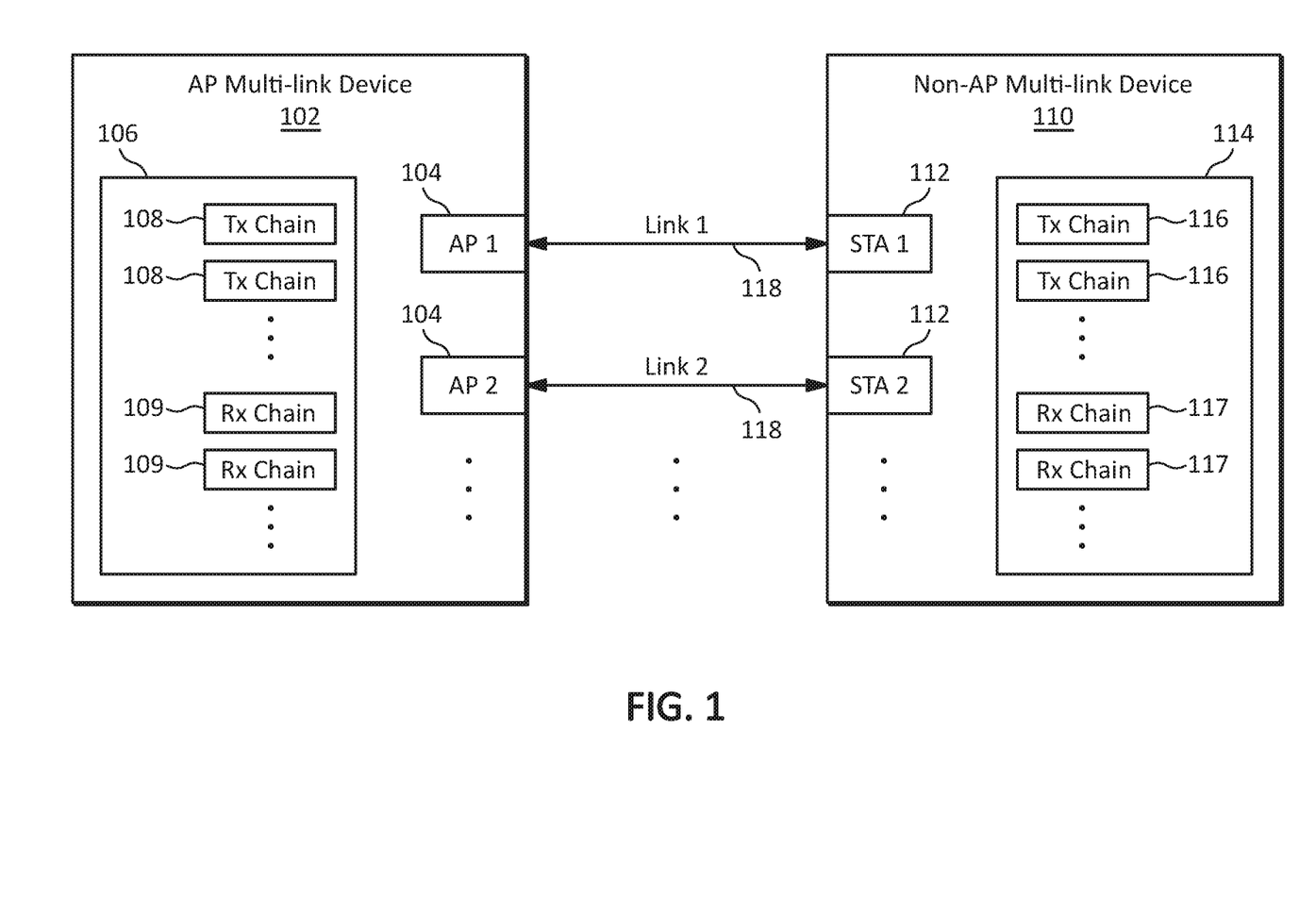
FIG. 1 illustrates an example embodiment of a system for implementing multi-link operations in accordance with the disclosure.

FIG. 1 illustrates an example embodiment of a system for implementing multi-link operations in accordance with the disclosure. The system illustrated in FIG. 1 may include an AP MLD 102 and a non-AP MLD 110. The AP MLD 102 may include multiple APs 104 (AP 1, AP 2, . . . ), and the STA MLD 110 may include multiple STAs 112 (STA 1, STA 2, . . . ). In the example illustrated in FIG. 1, each AP 104 at the AP MLD 102 may communicate with a corresponding STA 112 at the non-AP MLD 110, thereby forming corresponding links 118 (Link 1, Link 2, . . . ). In various embodiments, any number of links may be used.

The STAs 112 may also be referred to as clients, and the non-AP MLD 110 may also be referred to as a client MLD or a non-AP MLD.

The AP MLD 102 may include a sharing chain set 106 including one or more RF transmit (Tx) chains 108 and/or one or more RF receive (Rx) chains 109 that may be shared among the APs 104. The non-AP MLD 110 may include a sharing chain set 114 including one more RF transmit chains 116 and/or one or more RF receive chains 117 that may be shared among the STAs 112.

One or more of the links 118 may implement spatial multiplexing in which an AP 104 and a corresponding STA 112 may communicate using two or more spatial streams simultaneously on a corresponding link 118. In some embodiments, a transmit chain or a receive chain may support a single (1×1) spatial stream. Thus, two chains may be required on each end of a link to implement two simultaneous spatial streams (2×2), three chains may be required on each end of a link to implement three simultaneous spatial streams (3×3), etc. In various embodiments, any number of spatial streams may be used on any link.

In some embodiments, one or more of the APs 104 and/or STAs 112 may have enough dedicated transmit and/or receive chains to support a specified level of spatial multiplexing (e.g., 1×1, 2×2, etc.). However, in some embodiments, one or more of the shared transmit chains 108 and 116 or shared receive chains 109 or 117 may be shared between the APs 104 or STAs 112, respectively, for example, to reduce the cost, complexity, power consumption, and/or the like, of an MLD.

In some embodiments, the APs 104 in the AP MLD 102 may be implemented with wireless transceivers in which the APs 104 each have a separate physical (PHY) interface to the wireless media, but share a single interface to a media access control (MAC) and/or logical link control (LLC) sublayer. Thus, the collection of APs 104 may appear as a single device to upper layer protocols. Similarly, the STAs, 112 in the non-AP MLD 110 may separate PHY but shared MAC interfaces.

The system illustrated in FIG. 1 may be used, for example, to implement any of the processes, methods, techniques, and/or the like, disclosed herein.

Figure 2:
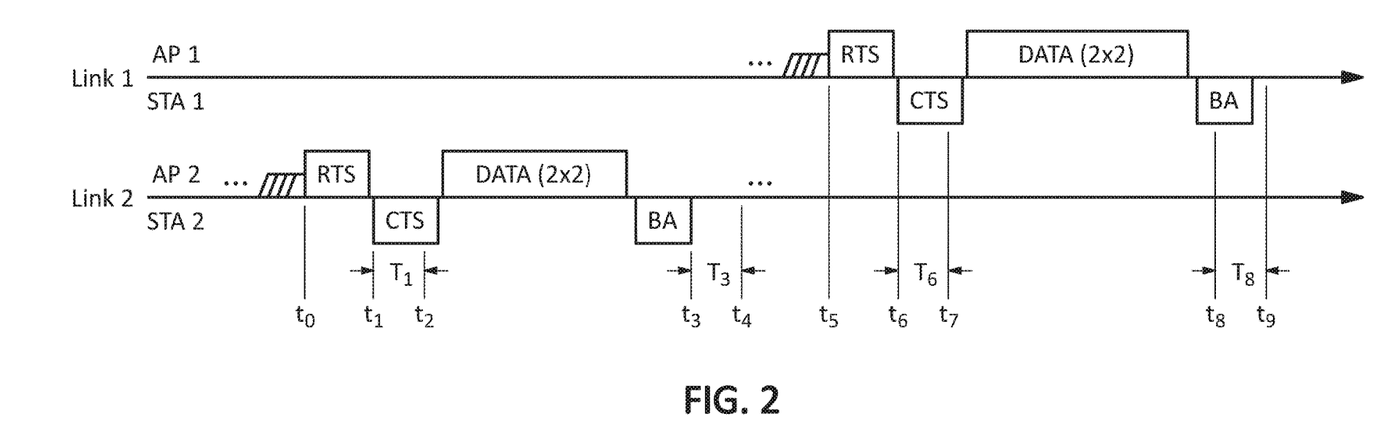
FIG. 2 illustrates an example embodiment of a multi-link spatial multiplexing operation in accordance with the disclosure.

FIG. 2 illustrates an example embodiment of a multi-link spatial multiplexing operation in accordance with the disclosure. The embodiment illustrated in FIG. 2 may be implemented, for example, using the system illustrated in FIG. 1.

In the example illustrated in FIG. 2, a non-AP MLD may use two links (Link 1 and Link 2), each capable of using a maximum of two spatial streams, to communicate with an AP MLD. In this example, the non-AP MLD may have two receive chains that may be shared between Link 1 and Link 2. Data transmissions from an AP MLD to the non-AP MLD on Link 1 (AP1) are shown above the horizontal timeline for Link 1, and data transmissions from the non-AP MLD to the AP MLD on Link 1 (STA1) are shown below the timeline for Link 1. Similarly, data transmissions to/from the non-AP MLD on Link 2 (AP2/STA2) are shown above/below the horizontal timeline for Link 2.

The non-AP MLD may initially switch one receive chain to Link 1 and one receive chain to Link 2. Thus, the non-AP MLD may initially listen in 1×1 mode on each link.

At time $t_0$, the non-AP MLD may receive a request-to-send (RTS) type of message from the AP MLD on Link 2. In some embodiments, the RTS-type message may be an enhanced RTS-type message that may include additional information such as information about a number of spatial streams to use. In some embodiments, an enhanced RTS-type message may be based on a multi-user RTS (MU-RTS) that may include information about a number of spatial streams to use. At time $t_1$, the non-AP MLD may send a clear-to-send (CTS) message to the AP MLD on Link 2 and begin switching the receive chain from Link 1 to Link 2. After a switching delay $T_1$, Link 2 may be configured for 2×2 operation (two spatial streams) using both shared receive chains at time $t_2$. During the time Link 2 is configured for 2×2 operation, the non-AP MLD may be unable to perform any listen, transmit, and/or receive operations on Link 1.

The non-AP MLD may then receive data from the AP MLD using two spatial streams mode) on Link 2. After the data transfer is complete, the non-AP MLD may send an acknowledgment message (BA) to the AP MLD. At time $t_3$, the non-AP MLD may begin switching one of the receive chains back to Link 2. After a switching delay $T_3$, both links may once again be configured for single stream operation at time $t_4$, and the non-AP MLD may resume listening on both links.

At time $t_5$, the non-AP MLD may receive an enhanced RTS-type message from the AP MLD on Link 1. At time $t_6$, the non-AP MLD may send a CTS message to the AP MLD on Link 1 and begin switching the receive chain from Link 2 to Link 1. After a switching delay $T_6$, Link 1 may be configured for 2×2 operation using both shared receive chains at time $t_7$. During the time Link 1 is configured for 2×2 operation, the non-AP MLD may be unable to perform any listen, transmit, and/or receive operations on Link 2.

The non-AP MLD may then receive data from the AP MLD using in 2×2 mode on Link 1. After the data transfer is complete, the non-AP MLD may send an acknowledgment message (BA) to the AP MLD. At time $t_8$, the non-AP MLD may begin switching one of the receive chains from Link 1 back to Link 2. After a switching delay $T_8$, both links may once again be configured for single stream operation at time $t_9$, and the non-AP MLD may resume listening on both links.

Capability Indication

In some embodiments, a non-AP MLD may indicate to an AP MLD one or more capabilities relating to spatial multiplexing and/or multi-link operation. For example, the non-AP MLD may indicate how many spatial streams may be used by each link. As another example, the non-AP MLD may use a binary flag to indicate whether the non-AP MLD is capable of sharing one or more RF chains between links. As a further example, a non-AP MLD may indicate a number of RF chains (e.g., transmit and/or receive chains) it may share between links.

In some embodiments, a non-AP MLD may indicate one or more capabilities to an AP MLD by including information about its capabilities in a multi-link element or field that may be used during a multi-link setup process. For example, a non-AP MLD may include information about its capabilities in a multi-link (ML) element along with other information such as simultaneous transmit and receive (STR) operation, number of supported links, and/or the like. As another example, a non-AP MLD may indicate one or more capabilities to an AP MLD using an operating mode (OM) indication mechanism such as an OM Control subfield used during an operating mode indication (OMI) procedure. In some embodiments, the maximum number of spatial streams on one or more links may be updated after setup in a manner similar to dynamic STR capability signaling and OW updates, for example, in the IEEE 802.11ax standard.

In some embodiments, an AP MLD may indicate a capability relating to spatial multiplexing and/or multi-link operation to a non-AP MLD. In such an embodiment, in addition to the techniques described above, an AP MLD may provide capability information relating to spatial multiplexing and/or multi-link operation to a non-AP MLD in a beacon frame (e.g., in one or more capability information fields).

Figure 3:
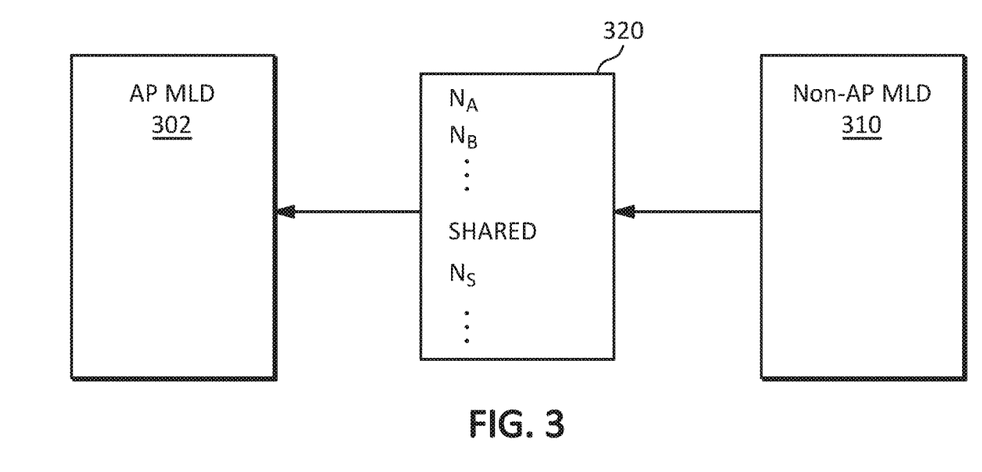
FIG. 3 illustrates an embodiment of a capability indication operation for multi-link devices with spatial multiplexing in accordance with the disclosure.

FIG. 3 illustrates an embodiment of a capability indication operation for MLDs with spatial multiplexing in accordance with the disclosure. In the embodiment illustrated in FIG. 3, a non-AP MLD 310 may send capability information 320 to an AP MLD 302 using any suitable mechanism such as in an ML element or OM Control subfield as described above. In the example illustrated in FIG. 3, the capability information 320 may include any number of the following elements. One or more elements $N_K$ may indicate a maximum number of spatial streams supported by a Link K. Thus, $N_A$, $N_B$, . . . may indicate a maximum number of spatial streams supported by Link A, Link B, etc., respectively. An element SHARED may be a binary flag that may indicate that the non-AP MLD is capable (SHARED=1) or is not capable (SHARED=0) of sharing one or more RF chains between links. An element $N_S$ may indicate a number of RF chains the non-AP MLD may be capable of sharing between links. In some embodiments, the capability information 320 may include less information or additional information. For example, in some embodiments, one or more additional elements may be included to distinguish between capabilities for transmit and/or receive operation, to distinguish chains that may only be shared between a subset of the links, and/or the like.

Figure 4A:
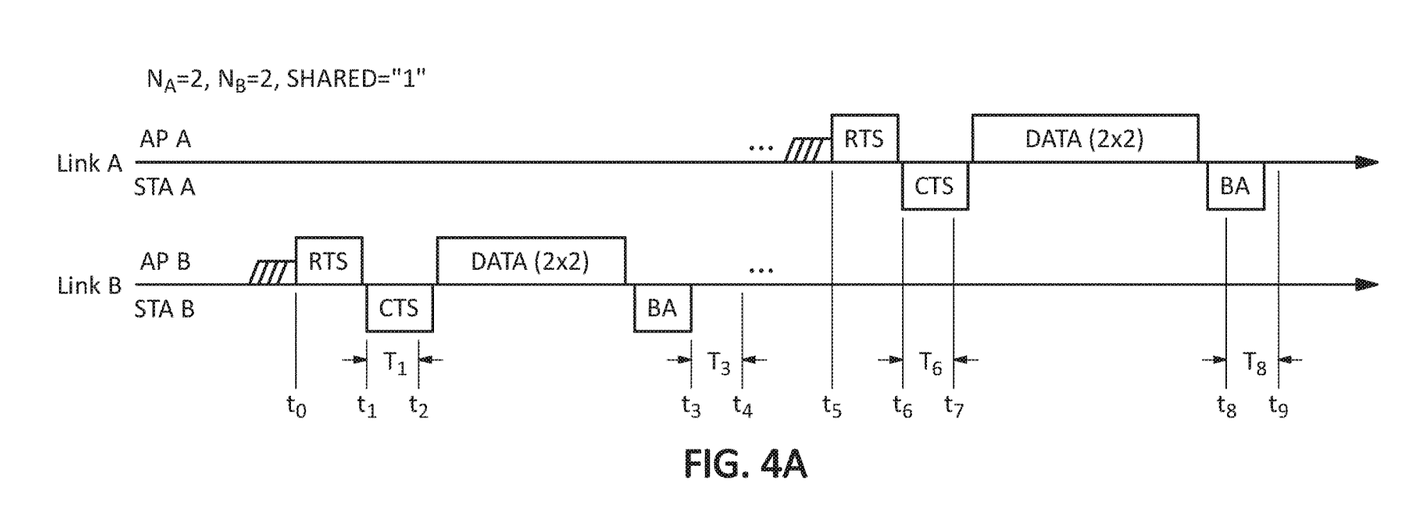
FIG. 4A illustrates an example embodiment of a multi-link spatial multiplexing operation based on capability indication in accordance with the disclosure.

FIG. 4A illustrates an example embodiment of a multi-link spatial multiplexing operation based on capability indication in accordance with the disclosure. Depending on the implementation details, the embodiment illustrated in FIG. 4A may be described as an enhanced single link radio operation. Data transmissions from an AP MLD to the non-AP MLD on Link A (AP A) are shown above the horizontal timeline for Link A, and data transmissions from the non-AP MLD to the AP MLD on Link A (STA A) are shown below the timeline for Link A. Similarly, data transmissions to/from the non-AP MLD on Link B (AP B/STA B) are shown above/below the horizontal timeline for Link B.

In the embodiment illustrated in FIG. 4A, a non-AP MLD may use two links: Link A and Link B. Each link may use a maximum of 2 spatial streams per link, thus, $N_A$=2 and $N_B$=2. The non-AP MLD may have a transceiver with two 1×1 receive chains, either of which may be used by Link A or Link B. Thus, the flag SHARED="1".

The operation illustrated in FIG. 4A may generally proceed in a manner similar to the operation illustrated in FIG. 2. Referring to FIG. 4A, the non-AP MLD may initially switch one receive chain to each of Link A and Link B and listen on both links in 1×1 mode. At time $t_0$, the non-AP MLD may receive an enhanced RTS-type message from an AP MLD on Link B to initiate a transmission opportunity (TXOP). The non-AP MLD may then switch the shared receive chain from Link A to Link B to configure Link B for 2×2 spatial steam operation. After the TXOP data transfer is completed in 2×2 mode, the non-AP MLD may switch a shared receive chain from Link B to Link A and resume listening on both links in 1×1 mode. At time $t_5$, the AP MLD may initiate another TXOP, this time on Link A. The non-AP MLD may perform another sequence of operations in which a shared receive chain is temporarily switched from Link B to Link A so Link A may operation in 2×2 mode for the data transfer. After the TXOP is complete on Link A, the non-AP MLD may switch a shared receive chain from Link A back to Link B and resume listening on both links in 1×1 mode.

Figure 4B:
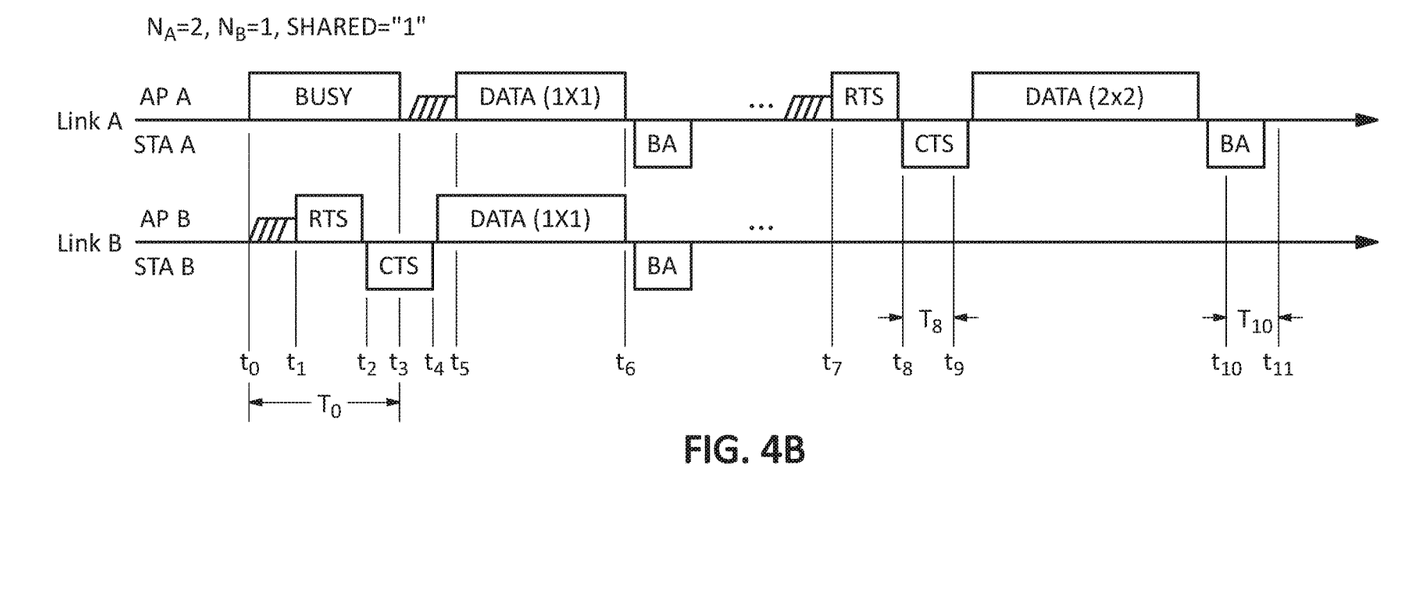
FIG. 4B illustrates an embodiment of a multi-link spatial multiplexing operation with links having asymmetric capabilities in accordance with the disclosure.
Figure 4C:
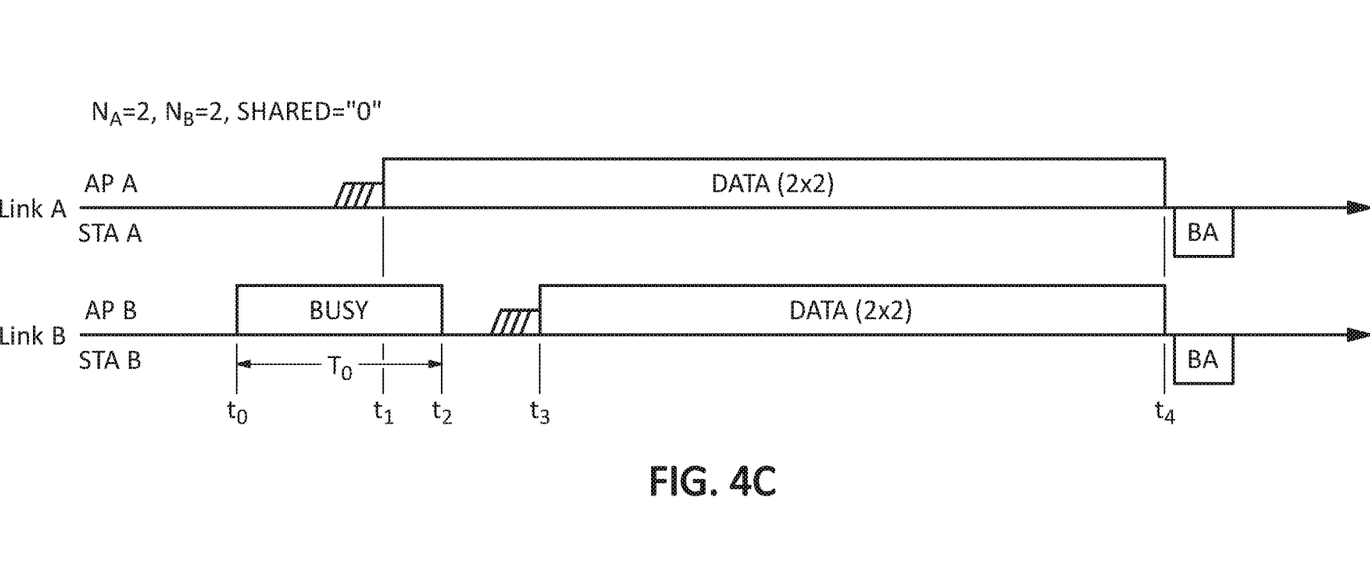
FIG. 4C illustrates an embodiment of a multi-link spatial multiplexing operation without chain sharing between links in accordance with the disclosure.

In some embodiments, sending a capability indication from a non-AP MLD to an AP MLD may enable additional spatial multiplexing operations, for example, as illustrated in FIG. 4B through FIG. 4C.

FIG. 4B illustrates an embodiment of a multi-link spatial multiplexing operation with links having asymmetric capabilities in accordance with the disclosure. In the example illustrated in FIG. 4B, a non-AP MLD may have a first link (Link A) that may support a maximum of two spatial streams ($N_A$=2), but a second link (Link B) that may support a maximum of one spatial stream ($N_B$=1). Thus the non-AP MLD may switch to 2×2 mode on Link A, however, Link B may only operate in 1×1 mode. The non-AP MLD may have a transceiver with two 1×1 receive chains, either of which may be used by Link A, but only one of which may be used by Link B. Because the non-AP MLD is capable of sharing at least one receive chain the flag SHARED="1". Thus, the capabilities indicated from the non-AP MLD to the AP MLD may be $N_A$=2, $N_B$=1, and SHARED="1". Depending on the implementation details, a request (e.g., an RTS or an enhanced RTS-type message) may not be required to initiate a TXOP on Link B.

Referring to FIG. 4B, Link A may be busy (e.g., performing an operation in 1×1 mode) during time interval $T_0$. Link B may initially be listening in 1×1 mode while Link A is busy. At time $t_1$, Link B may receive a request (e.g., an RTS or an enhanced RTS-type message) for a TXOP from the AP MLD while Link A is busy. The non-AP MLD may send a CTS message on Link B at time $t_2$. Since Link B can support a maximum of one spatial stream, no switching operation may be performed, and Link B may begin receiving in 1×1 mode at time $t_4$. At time $t_5$, Link A may begin receiving data in 1×1 mode for a TXOP because Link B is using the other 1×1 receive chain. At time $t_6$, both links may complete their respective data transfers, send acknowledgments (BA) to the AP MLD, and return to listening in 1×1 mode on both links. Since both links were already configured for 1×1 operation, no shared receive chains are switched.

At time $t_7$, the non-AP MLD may receive a request (e.g., an RTS or an enhanced RTS-type message) from the AP MLD on Link A. At time $t_8$, the non-AP MLD may send a CTS message to the AP MLD on Link A and begin switching the shared receive chain from Link B to Link A. After a switching delay $T_8$, Link A may be configured for 2×2 operation using both shared receive chains at time $t_9$. During the time Link A is configured for 2×2 operation, the non-AP MLD may be unable to perform any listen, transmit, and/or receive operations on Link B.

The non-AP MLD may then receive data from the AP MLD using in 2×2 mode on Link A. After the data transfer is complete, the non-AP MLD may send an acknowledgment message (BA) to the AP MLD. At time $t_{10}$, the non-AP MLD may begin switching one of the receive chains from Link A back to Link B. After a switching delay $T_{10}$, both links may once again be configured for single stream operation at time $t_{11}$, and the non-AP MLD may resume listening in 1×1 mode on both links.

FIG. 4C illustrates an embodiment of a multi-link spatial multiplexing operation without chain sharing between links in accordance with the disclosure. In the embodiment illustrated in FIG. 4C, a non-AP MLD may have two links, each of which may use a maximum of two spatial streams. The non-AP MLD may have a transceiver with two dedicated 1×1 receive chains (or one dedicated 2×2 receive chain) per link. However, the non-AP MLD may not be capable of sharing any receive chains. Thus, the capabilities indicated from the non-AP MLD to the AP MLD may be $N_A$=2, $N_B$=2, and SHARED="0". Depending on the STR capability, both links may be accessible simultaneously.

Referring to FIG. 4C, Link B may be busy during time interval $T_0$ from time $t_0$ to time $t_2$. At time the non-AP MLD may begin receiving data on Link A in 2×2 mode without needing an RTS of any type because no receive chains may be switched to Link A. Similarly, at time $t_3$, the non-AP MLD may begin receiving data on Link B in 2×2 mode without needing an RTS of any type because no receive chains may be switched to Link B. The data transfers on Link A and Link B may be completed at time $t_4$. Acknowledgments BA may be sent on both links, and both links may return to listening (e.g., in 1×1 mode).

In some additional example embodiments, a non-AP MLD may use more than two links and share any number of receive chains between links. For example, in one embodiment, a non-AP MLD may use three links and may have a transceiver with two 1×1 receive chains that may be shared between any of the links. Thus, the capabilities indicated from the non-AP MLD to the AP MLD may be $N_A=2$, $N_B=2$, $N_C=2$, and SHARED="1".

In this example, the non-AP MLD may listen in 1×1 mode on two of the three links. In response to receiving an enhanced RTS-type message on one of the listening links, the non-AP MLD may switch one of the shared receive chains to the link that received the enhanced RTS-type message and configure that link for 2×2 data transfer during the TXOP. The other two links may not be accessible during the TXOP. Alternatively, if the non-AP MLD has a transceiver with three 1×1 receive chains that may be shared between links, all three links may be able to listen in 1×1 mode, and one of the other links may remain accessible when one link is configured for 2×2 mode.

NAV Synchronization

Figure 5:
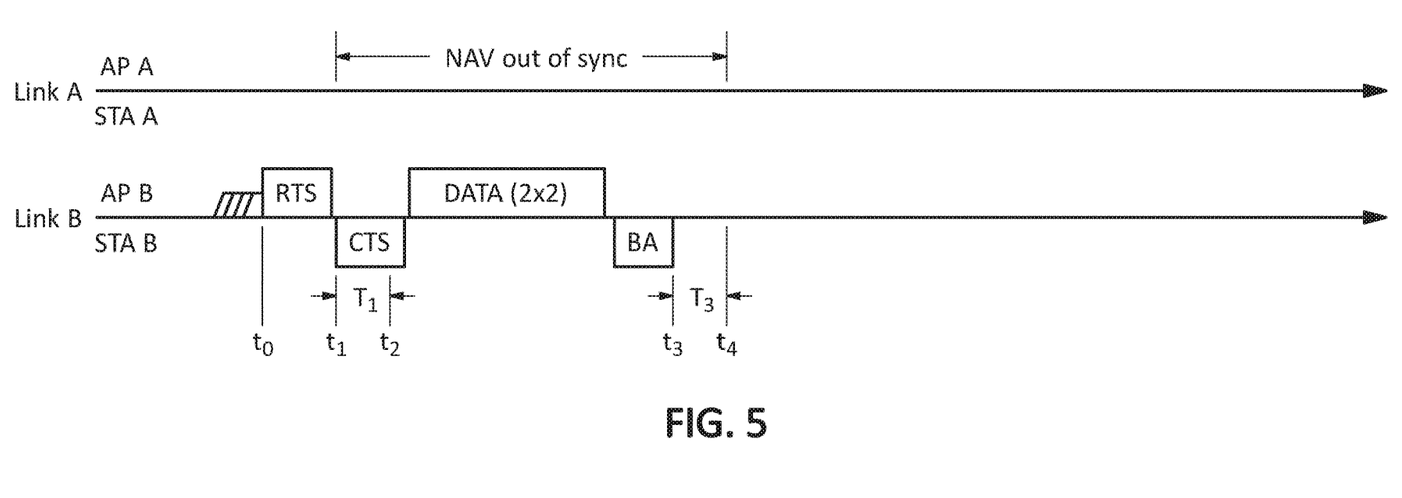
FIG. 5 illustrates an example embodiment of a multi-link operation with receive chain sharing in accordance with the disclosure.

FIG. 5 illustrates an example embodiment of a multi-link operation (MLO) with receive chain sharing in accordance with the disclosure. In the operation illustrated in FIG. 5, a non-AP MLD may use two links (Link A and Link B), each of which may use a maximum of two spatial streams. The non-AP MLD may have a transceiver with two 1×1 receive chains, both of which may be shared between Link A and Link B.

Referring to FIG. 5, the non-AP MLD may initially switch one receive chain to each of Link A and Link B and listen on both links in 1×1 mode. At time $t_0$, the non-AP MLD may receive an enhanced RTS-type message from an AP MLD on Link B to initiate a transmission opportunity (TXOP). The non-AP MLD may then switch the shared receive chain from Link A to Link B to configure Link B for 2×2 spatial steam operation. After the TXOP data transfer is completed in 2×2 mode, the non-AP MLD may send an acknowledgment message (BA) to the AP MLD. At time $t_0$, the non-AP MLD may begin switching one of the receive chains from Link B back to Link A. After a switching delay $T_3$, both links may once again be configured for single stream operation at time $t_4$, and the non-AP MLD may resume listening on both links in 1×1 mode.

However, during the time Link A does not have access to either of the shared receive chains, (e.g., from time $t_1$ to time $t_4$), the non-AP MLD may be unable to listen on Link A. Thus, after time $t_4$, if the non-AP MLD attempts to initiate a transmission on Link A, it may be unaware of one or more other operations (e.g., other traffic) that may cause a collision on Link A. For example, some embodiments may implement a collision avoidance technique involving a network allocation vector (NAV) which may provide a countdown timer. However, during the time period from $t_1$ to time $t_4$ (during which the non-AP MLD may be unable to listen on Link A), the NAV may become unsynchronized. This may happen, for example, if the non-AP MLD misses a header that was transmitted on Link A during the time the non-AP MLD could not listen on Link A. Thus, in some embodiments, a non-AP MLD may violate a principle of carrier sense multiple access (CSMA) in which the non-AP MLD may be expected to monitor a channel, and when it determines the channel is idle, wait for a backoff time determined by the NAV before transmitting.

In some embodiments, to address this type of synchronization problem, a non-AP MLD in accordance with the disclosure may perform a collision avoidance operation based on switching a shared receive chain to a link that previously did not have access to a receive chain. For example, in the embodiment illustrated in FIG. 5, the non-AP MLD may be configured to wait for a predetermined backoff time beginning from the time the non-AP MLD is first able to listen on Link A, (e.g., time $t_4$) before transmitting on Link A. In some embodiments, the non-AP MLD may monitor Link A during the backoff time, for example, to determine if Link A is still idle. As another example, in some embodiments, the non-AP MLD may wait until Link A is resynchronized with the NAV before transmitting on Link A.

Switching Operations

In some embodiments, an MLD may implement a default policy of immediately switching to the maximum number of spatial streams that may be used on each link in response to a transmission request.

Figure 6:
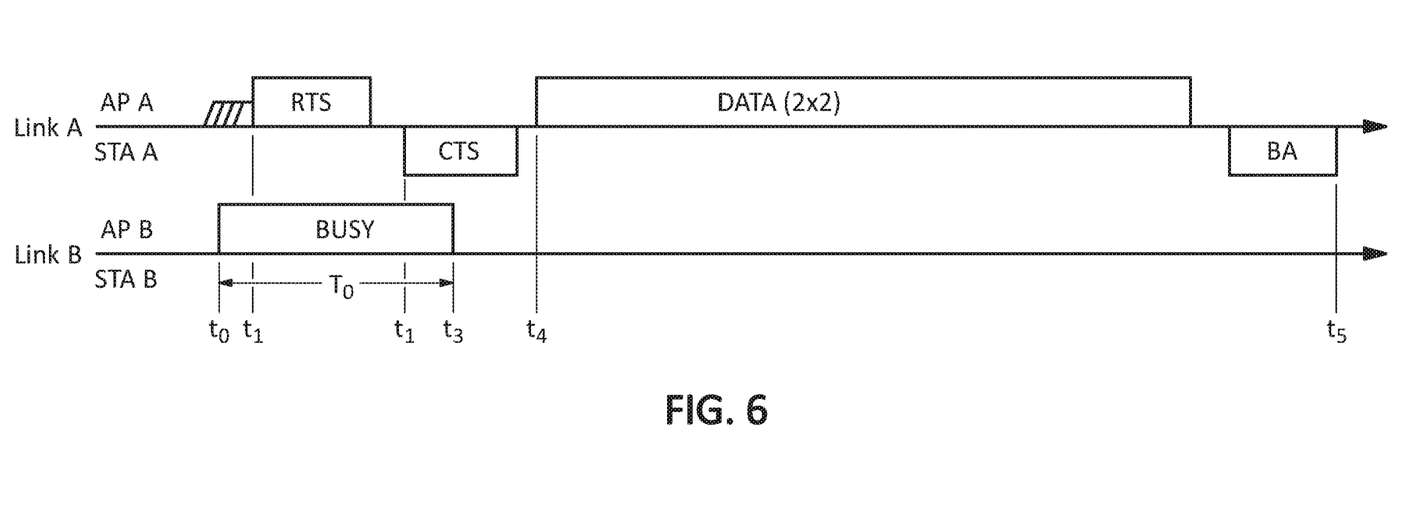
FIG. 6 illustrates an example embodiment of a multi-link spatial multiplexing operation with immediate switching in accordance with the disclosure.

FIG. 6 illustrates an example embodiment of a multi-link spatial multiplexing operation with immediate switching in accordance with the disclosure. In the operation illustrated in FIG. 6, a non-AP MLD may use two links (Link A and Link B), each of which may use a maximum of two spatial streams. The non-AP MLD may have a transceiver with at least two 1×1 receive chains, at least two of which may be used by Link A.

Referring to FIG. 6, Link B may be busy during interval $T_0$ between time $t_0$ and time $t_3$. At time $t_1$, the non-AP MLD may receive an enhanced RTS-type message on Link A. In response to the RTS, the non-AP MLD may attempt to immediately maximize the number of spatial streams on each link that may be used for a data transfer for the TXOP initiated by the enhanced RTS-type message. In this example, because Link B is busy at time $t_1$, the non-AP MLD may ignore Link B and switch to the maximum number of spatial streams on Link A. Thus, at time $t_4$, the non-AP MLD may begin transmitting in 2×2 mode on Link A.

However, if Link B has a characteristic (e.g., higher bandwidth, better quality, lower latency, lower power consumption, and/or the like) that may be better than Link A, the non-AP MLD may fail to exploit one or more advantages of using Link B. For example, if Link B has substantially higher bandwidth than Link A, and Link B becomes available shortly after the non-AP MLD switched to the maximum number of spatial streams on Link A (e.g., Link B became available at time $t_3$ as illustrated in FIG. 6), the non-AP MLD may lose the performance gain that it could have realized if it waited until Link B became available. As illustrated in FIG. 6, Link B may be available during the entire duration of the TXOP data transfer on Link A. If the non-AP MLD had waited the relatively short duration until time $t_3$ (rather than immediately maximizing the number of spatial streams on Link A at time $t_1$), the non-AP MLD may have used Link B (which was otherwise idle) to achieve higher throughput. For example, the non-AP MLD may have moved the entire TXOP data transfer to Link B which may provide better performance than Link A. As another example, the non-AP MLD may have used both Link A and Link B for the data transfer, which may provide an even greater performance gain compared to using only Link A or only Link B.

In some embodiments, an MLD may implement one or more different types of switching operations that may enable the MLD to take advantage of one or more links that may have one or more advantages. For example, in some embodiments, before committing resources to a link (e.g., switching a shared RF chain to the link), an MLD may determine the availability of one or more other links. For example, an MLD may implement a wait time after receiving a transmission request for a first link to enable the MLD to determine if a second link with one or more better performance characteristics becomes available. This may be referred to as a non-immediate switching mode. In some embodiments, it may be beneficial to wait to determine if a second link becomes available, even if it does not have better performance characteristics, because adding the second link may still add additional bandwidth to a TXOP.

Any of the different types of switching operations disclosed herein may be applied to AP MLDs and/or non-AP MLDs.

In some embodiments, an immediate switching mode may be enabled by default, for example, on some or all links of a link set that shares one or more receive chains. A non-immediate switching mode may then be selectively enabled by an AP MLD and/or a non-AP MLD based on any suitable criteria such as the presence of links having a diversity of performance characteristics. In the case of a non-AP MLD implementing a non-immediate switching mode, the non-AP MLD may send a request or notification for the AP MLD to enable a non-immediate switching mode for one or more links. In some embodiments, one or more non-immediate switching modes may be enabled by default.

In some embodiments, a wait time or other technique for determining the availability of another link may be applied on a per-link basis. For example, an MLD may immediately switch receive chains to links with relatively high performance, but the MLD may wait to see if a higher performance link may become available before switching a receive chain to a link with relatively low performance.

In some embodiments, an MLD may determine the availability of one or more other links by monitoring the one or more other links. For example, an MLD may continuously check the status of a link to determine if it is busy or available. In some embodiments, a wait time may be used to place a limit on the monitoring. In some embodiments, a wait time may be varied based on a performance characteristic of a link For example, it may be worth waiting a longer time for a specific link if it has a particularly high bandwidth. In some embodiments, an MLD may be configured to override the monitoring based on one or more characteristics of one or more links. For example, if a first link has a higher performance characteristic than a second link, the MLD may override a wait time and immediately switch a receive chain to the first link.

In some embodiments, one or more switching operations in accordance with the disclosure may be initiated by any type of action by any MLD. For example, in some instances, a wait time for a non-immediate switching mode may be initiated by the reception of an enhanced RTS-type message for a TXOP. In some other instances, however, an AP MLD may send an enhanced RTS-type trigger instead of an enhanced RTS-type message to initiate a TXOP on a set of links with non-immediate switching enabled.

In some embodiments, an enhanced RTS-type trigger may be accompanied by information that an MLD may use to implement one or more switching operations. For example, an AP MLD may send an enhanced RTS-type trigger to a non-AP MLD that may include information such as instructions on how to perform chain switching, and information on spatial streams to use for a TXOP initiated by the enhanced RTS-type trigger (e.g., from the beginning of data reception in the TXOP). In some embodiments, the information may include a countdown wait time and/or a limit on a number Physical Protocol Data Units (PPDUs) before switching. In some embodiments, a countdown wait time and/or PPDU limit may be set to zero, which may indicate an immediate switch operation, for example, if only one PPDU is present in the TXOP. In some embodiments, an enhanced RTS-type trigger may include additional information such as a number of spatial streams to use.

In some embodiments, and depending on the implementation details, immediate and non-immediate switching schemes in accordance with the disclosure may enable efficient embodiments and/or cost-effective embodiments, respectively.

Figure 7:
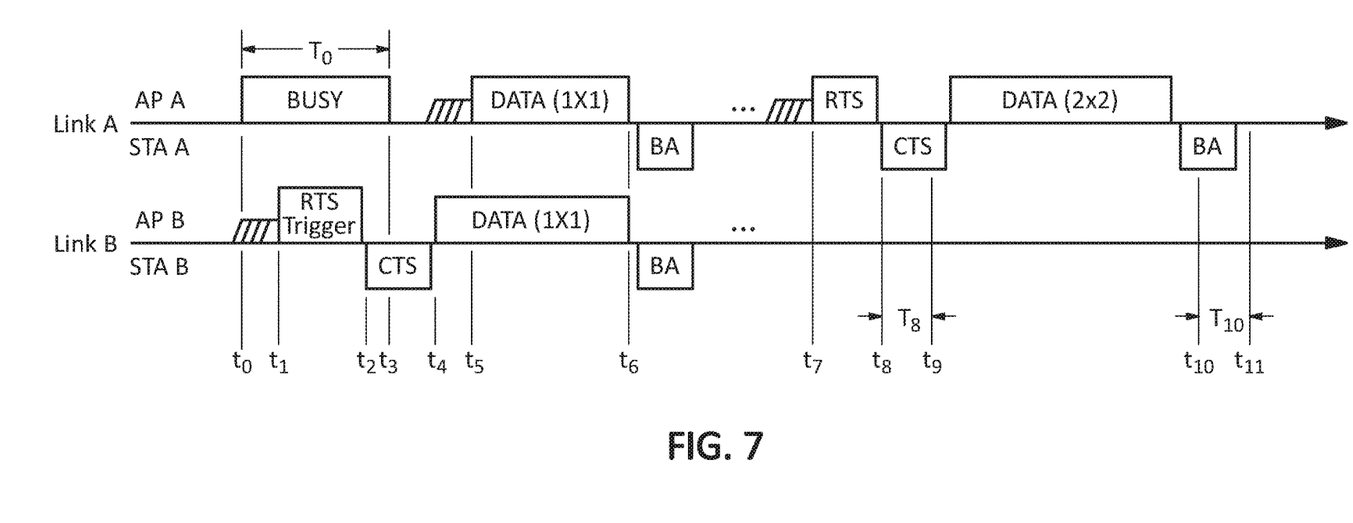
FIG. 7 illustrates an example embodiment of a multi-link spatial multiplexing operation with non-immediate switching in accordance with the disclosure.

FIG. 7 illustrates an example embodiment of a multi-link spatial multiplexing operation with non-immediate switching in accordance with the disclosure. In the operation illustrated in FIG. 7, a non-AP MLD may use two links (Link A and Link B), each of which may use a maximum of two spatial streams. The non-AP MLD may have a transceiver with two 1×1 receive chains that may be shared between Link A and Link B.

In this example, Link A, which may be set for default immediate switching, may operate on a 6G Hz band with a 160 MHz link bandwidth. Link B, which may be set for non-immediate switching, may operate on a 5 GHz band with a 40 MHz link bandwidth.

Referring to FIG. 7, Link A may be busy during time interval $T_0$. Link B may initially be listening in 1×1 mode while Link A is busy. At time $t_1$, Link B may receive an enhanced RTS-type trigger for a TXOP from the AP MLD while Link A is busy. If Link B was operating in an immediate switching mode, it would immediately switch both shared receive chains to Link B. However, because Link B is operating in non-immediate switching mode, it may wait to determine if Link A becomes available within a countdown wait time. Moreover, the trigger at time $t_1$ may also include information instructing the non-AP MLD to use a 1×1 mode and implement a countdown wait time. At time $t_2$, the non-AP MLD may send a CTS message on Link B. At time $t_4$, the non-AP MLD may begin the data transfer for the TXOP in 1×1 mode on Link B, which has a 40 MHz bandwidth.

At time $t_3$, however, Link A may become available. Thus, at time $t_5$, the non-AP MLD may begin using Link A to assist with the data transfer for the TXOP. Because Link A has a 160 MHz bandwidth, this may substantially increase the speed of the data transfer for the TXOP. In contrast, if was operating in an immediate switching mode, it may have immediately switched both shared receive chains to Link B and failed to exploit the greater bandwidth of Link A.

At time $t_6$, Links A and B may complete their data transfer for the TXOP, send acknowledgments (BAs) to the AP MLD, and return to listening in 1×1 mode on both links.

At time $t_7$, the non-AP MLD may receive an enhanced RTS message from the AP MLD on Link A. At time $t_8$, the non-AP MLD may send a CTS message to the AP MLD on Link A and begin switching the shared receive chain from Link B to Link A. After a switching delay $T_8$, Link A may be configured for 2×2 operation using both shared receive chains at time $t_9$. After the data transfer is complete, the non-AP MLD may send an acknowledgment message (BA) to the AP MLD. At time $t_8$, the non-AP MLD may begin switching one of the receive chains from Link A back to Link B. After a switching delay $T_{10}$, both links may once again be configured for single stream operation at time $t_{11}$, and the non-AP MLD may resume listening in 1×1 mode on both links. Thus, in the embodiment illustrated in FIG. 7, an enhanced RTS-type trigger sent on Link B may initiate TXOPs on Link B, while an enhanced RTS-type message sent on Link A may initiate TXOPs on Link A.

Sounding in Multi-Link Operations

In some embodiments, MLDs may use multiple-input and multiple-output (MIMO) techniques to increase the bandwidth of a link. To support MIMO operations, one or more beamforming techniques may be used. For example, in a sounding sequence for a beamforming operation, a first MLD (which may be referred to as a beamformer) may send a null data packet (NDP) announcement to a second MLD (which may be referred to as a beamformee), followed by the actual NDP. The NDP may contain a known data pattern that the beamformee may analyze to determine one or more characteristics of the link on which the NDP was sent. Based on this analysis, the beamformee may send feedback to the beamformer, for example, in the form of a compressed beamforming report (CBR) and/or a channel quality indicator (CQI).

In some embodiments, analyzing an NDP may involve the use of a beamformee hardware block. To reduce the cost, complexity, power consumption, and/or the like, an MLD may share a beamformee block between one or more links. Sharing a beamformee block between links, however, may potentially cause performance problems as illustrated below.

Figure 8:
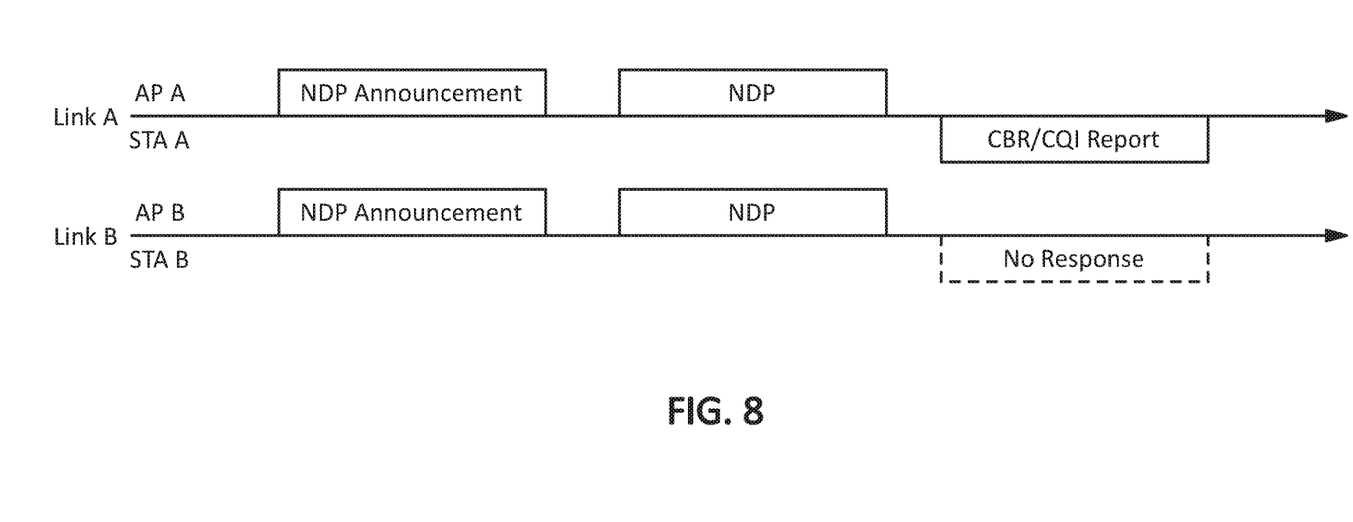
FIG. 8 illustrates an embodiment of a multi-link sounding operation in accordance with the disclosure.

FIG. 8 illustrates an embodiment of a multi-link sounding operation in accordance with the disclosure. For purposes of illustration, in the embodiment shown in FIG. 8, the beamformer may be implemented as an AP MLD, and the beamformee may be implemented as a non-AP MLD. In other embodiments, however, the beamformer and beamformee may be implemented as any types of MLD.

Referring to FIG. 8, the AP MLD may initiate a sounding sequence in which it may transmit an NDP announcement simultaneously on Link A and Link B. The AP MLD may then transmit the NDP simultaneously on Link A and Link B. However, if a single beamformee block is shared between Link A and Link B, the CBR and/or CQI report processing may only be performed for one link at a time. Thus, only one of the links (in this example, Link A) may be able to send a CBR and/or CQI report back to the AP MLD. Because of a lack of processing resources, Link B may send no response to AP MLD.

In some embodiments, failing to send a response may be detrimental to the performance of the non-AP MLD. For example, periodic soundings may be required to maintain beamforming operation between the beamformer and the beamformee. If a beamformer fails to receive a response to an NDP, the beamformer may use obsolete feedback data which may degrade the performance of a beamforming operation.

To reduce or eliminate potential problems that relay be caused by sharing a beamformee block between links, some embodiments of a beamformer according to the disclosure may not initiate a second sounding sequence on a second link with a beamformee if the second sounding sequence may overlap, or potentially overlap, with a first, ongoing sounding sequence on a first link with the beamformee. Thus, such an embodiment of a beamformer may not transmit the simultaneous NDP announcements and NDPs illustrated in FIG. 8.

Alternatively, or additionally, in some embodiments, a beamformee may indicate its sounding processing capabilities to a beamformer. This may enable the beamformer to avoid creating a situation that may result in a beamformee failing to send a response to a sounding sequence. For example, a non-AP MLD beamformee may indicate to an AP MLD beamformer that the non-AP MLD shares a single beamformee block between three specific links, the AP MLD may refrain from initiating any sounding sequences that may overlap on any of the three specific links.

Alternatively, or additionally, in some embodiments, a beamformee may request re-initiation of a sounding sequence that may overlap with another sounding sequence for the non-AP MLD. For example, if a beamformer AP MLD sends an NDP announcement (NDP-A) and an NDP to the same non-AP MLD beamformee simultaneously on multiple links, a mechanism for the non-AP MLD may request re-initiation of the sounding sequence on at least one of the links. Accordingly, the AP may re-initiate the sounding sequence on the one or more links requested by the non-AP MLD.

In some embodiments, the sharing of a beamformee hardware block between links may be completely independent of the sharing of RF chains between links. In some other embodiments, however, the sounding behavior of a beamformer may be related to sharing of RF chains between links. Thus, if a non-AP MLD shares one or more RF chains between links, an AP MLD may not perform simultaneous sounding on multiple links that are sharing the receive chains.

In some embodiments, and depending on the implementation details, any of the techniques described herein for preventing overlapping sounding sequences on multiple links that may share a beamformee block may enable cost-effective MLD implementations without compromising the performance of beamforming operations on the multiple links.

Wireless Station

Figure 9:
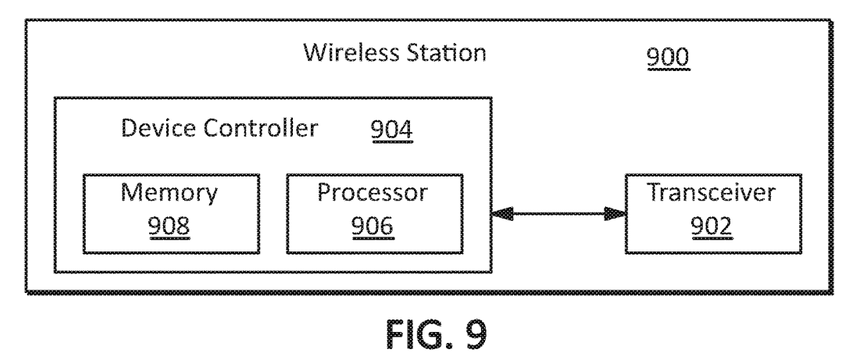
FIG. 9 illustrates an example embodiment of a wireless station according to the disclosure.

FIG. 9 illustrates an example embodiment of a wireless station according to the disclosure. The wireless station 900 (also referred to as a STA, a client and/or a non-AP MLD) illustrated in FIG. 9 may include a radio transceiver 902 and a device controller 904 which may control the operation of the transceiver 902 and/or any other components in the wireless station 900. The wireless station 900 may be used, for example, to implement any of the wireless station functionality described in this disclosure such as those related to capability indication, collision avoidance, switching operations, sounding on multi-link operations, and/or the like.

The device controller 904 may include, for example, one or more processors 906 and a memory 908 which may store instructions for the one or more processors 906 to execute to implement any of the wireless station functionality described in this disclosure.

Wireless Access Point

Figure 10:
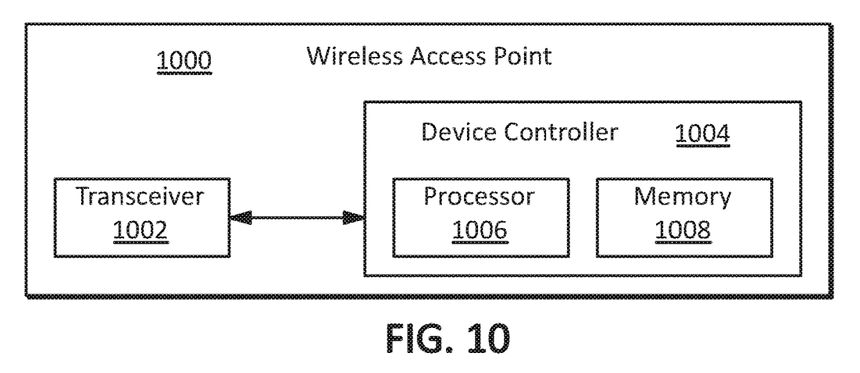
FIG. 10 illustrates an example embodiment of a wireless access point according to the disclosure.

FIG. 10 illustrates an example embodiment of a wireless access point according to the disclosure. The wireless access point 1000 (also referred to as an AP MLD) illustrated in FIG. 10 may include a radio transceiver 1002 and a device controller 1004 which may control the operation of the transceiver 1002 and/or any other components in the wireless access point 1000. The wireless access point 1000 may be used, for example, to implement any of the wireless access point (AP) functionality described in this disclosure such as those related to capability indication, collision avoidance, switching operations, sounding on multi-link operations, and/or the like.

The device controller 1004 may include, for example, one or more processors 1006 and a memory 1008 which may store instructions for the one or more processors 1006 to execute to implement any of the AP functionality described in this disclosure.

In the embodiments illustrated in FIGS. 9 and 10, the transceivers 902 and 1002 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The transceivers 902 and 1002 may be used, for example, to implement any of the APs 104, STAs 112, RF chains 108, 109, 116, and/or 117 illustrated in FIG. 1, and/or the like. The controllers 904 and 1004 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such a complex instruction set computer (CISC) processors such as x86 processors and/or reduced instruction set computer (RISC) processors such as ARM processors, and/or the like, executing instructions stored in any type of memory.

ADDITIONAL EMBODIMENTS

Figure 11:
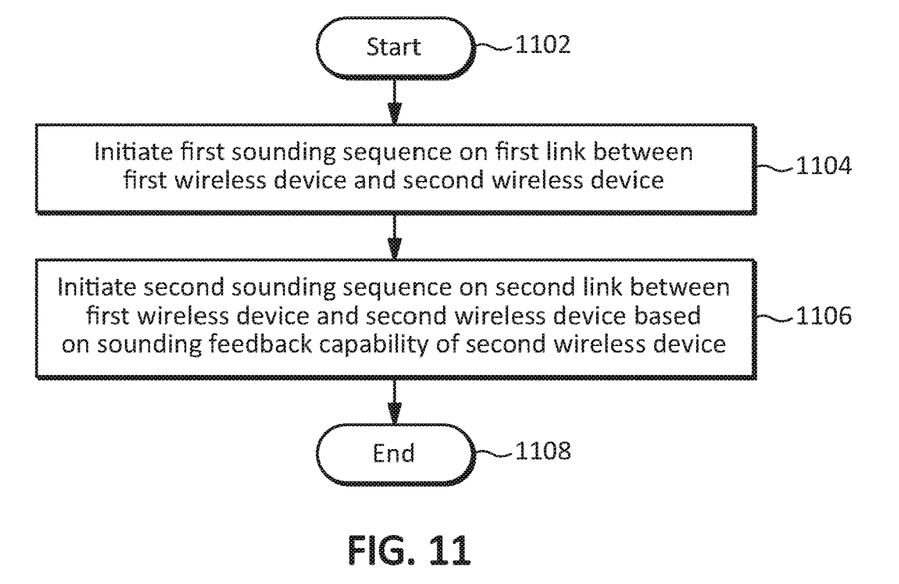
FIG. 11 illustrates an embodiment of a method for performing a sounding operation in accordance with the disclosure.

FIG. 11 illustrates an embodiment of a method for performing a sounding operation in accordance with the disclosure. The method may begin at operation 1102. At operation 1104, the method may initiate a first sounding sequence on a first link between a first wireless device and a second wireless device. In some embodiments, initiating the second sounding sequence may include scheduling the second sounding sequence to avoid overlapping the first sounding sequence and the second sounding sequence. At operation 1106, the method may initiate a second sounding sequence on a second link between the first wireless device and the second wireless device based on a sounding feedback capability of the second wireless device. In some embodiments, initiating the second sounding sequence may include initiating the second sounding sequence based on a request from the second wireless device.

In the embodiment illustrated in FIG. 11, as well as the other embodiments described in this disclosure, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. In some embodiments, the use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A wireless device comprising:
a transceiver configured to communicate through a first link and a second link;
wherein the wireless device is configured to indicate, through the transceiver, a number of spatial streams associated with the first link;
wherein the transceiver comprises one or more radio frequency (RF) chains;
wherein the wireless device is further configured to indicate, through the transceiver, a sharing capability of the one or more RF chains; and
wherein a first field of the sharing capability indicates that the transceiver is capable of sharing at least one of the one or more RF chains between the first link and the second link, and a second field of the sharing capability indicates a number of RF chains the transceiver is capable of sharing between the first link and the second link; and
wherein the wireless device is further configured to initiate a first sounding sequence on the first link and initiate a second sounding sequence on the second link.

2. The wireless device of claim 1, wherein the number of spatial streams associated with the first link comprises a maximum number of spatial streams for the first link.

3. The wireless device of claim 2, wherein the wireless device is further configured to indicate, through the transceiver, a maximum number of spatial streams for the second link.

4. The wireless device of claim 1, wherein:
the first sounding sequence on the first link is between the wireless device and a second wireless device; and the second sounding sequence on the second link is between the wireless device and the second wireless device based on a sounding feedback capability of the second wireless device.

5. The wireless device of claim 4, wherein the wireless device is further configured to schedule the second sounding sequence to avoid overlapping the first sounding sequence and the second sounding sequence.

6. The wireless device of claim 4, wherein the wireless device is further configured to initiate, through the transceiver, the second sounding sequence based on a request from the second wireless device.

7. The wireless device of claim 1, wherein the wireless device is further configured to:
determine an availability of the first link; and
use the one or more RF chains on the first link based on the availability of the first link.

8. The wireless device of claim 7, wherein the wireless device is further configured to determine the availability of the first link by monitoring the first link.

9. The wireless device of claim 8, wherein the wireless device is further configured to determine the availability of the first link by monitoring the first link based on a wait time.

10. The wireless device of claim 9, wherein the wireless device is further configured to override the monitoring based on a first characteristic of the first link and a second characteristic of the second link.

11. The wireless device of claim 7, wherein the wireless device is further configured to use the one or more RF chains on the first link based on information associated with a request received at the wireless device.

12. The wireless device of claim 11, wherein the information includes information for switching the one or more RF chains between the first link and the second link.

13. A wireless system, comprising:
a first wireless device including a transceiver;
a second wireless device;
wherein the first wireless device is configured to communicate using the transceiver through a first link and a second link with the second wireless device;
wherein the first wireless device is configured to indicate, through the transceiver, a number of spatial streams associated with the first link;
wherein the transceiver comprises one or more radio frequency (RF) chains;
wherein the first wireless device is further configured to indicate, through the transceiver, a sharing capability of the one or more RF chains; and
wherein a first field of the sharing capability indicates that the transceiver is capable of sharing at least one of the one or more RF chains between the first link and the second link, and a second field of the sharing capability indicates a number of RF chains the transceiver is capable of sharing between the first link and the second link; and
wherein the first wireless device is further configured to initiate a first sounding sequence on the first link and initiate a second sounding sequence on the second link.

14. The wireless system of claim 13, wherein the number of spatial streams associated with the first link comprises a maximum number of spatial streams for the first link.

15. The wireless system of claim 13, wherein the first wireless device is further configured to indicate, through the transceiver, a maximum number of spatial streams for the second link.

16. The wireless system of claim 13, wherein:
the first sounding sequence on the first link is between the first wireless device and the second wireless device; and
the second sounding sequence on the second link is between the first wireless device and the second wireless device based on a sounding feedback capability of the second wireless device.

17. The wireless system of claim 16, wherein the first wireless device is further configured to schedule the second sounding sequence to avoid overlapping the first sounding sequence and the second sounding sequence.

18. The wireless system of claim 16, wherein the first wireless device is further configured to initiate, through the transceiver, the second sounding sequence based on a request from the second wireless device.

* * * * *